United States Patent
Haverkamp (10) Patent No.: US 11,041,799 B2
(45) Date of Patent: Jun. 22, 2021

(54) DEVICE FOR 3D MEASUREMENT OF OBJECT COORDINATES

(71) Applicant: Carl Zeiss Industrielle Messtechnik GmbH, Oberkochen (DE)

(72) Inventor: Nils Haverkamp, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 16/893,282

(22) Filed: Jun. 4, 2020

(65) Prior Publication Data
US 2020/0386671 A1    Dec. 10, 2020

(30) Foreign Application Priority Data

Jun. 4, 2019   (DE) .................... 10 2019 208 114.2

(51) Int. Cl.
*G01J 3/46*      (2006.01)
*G01N 21/25*    (2006.01)
(Continued)

(52) U.S. Cl.
CPC .......... *G01N 21/255* (2013.01); *G01J 3/2823* (2013.01); *G01J 3/46* (2013.01); *G02B 27/4211* (2013.01)

(58) Field of Classification Search
CPC ........ G01J 3/46; G01J 3/50; G01J 3/02; G01J 3/524; G01J 3/51
(Continued)

(56) References Cited

U.S. PATENT DOCUMENTS 8,577,184 B2    11/2013  Young
2004/0109170 A1*  6/2004  Schick ............... G02B 21/0064
                                                     356/614
(Continued)

FOREIGN PATENT DOCUMENTS

DE    102005043627 A1   3/2007
DE    602005004332 T2   1/2009
DE    102017108033 A1   10/2018

OTHER PUBLICATIONS

Hubold M., et al. ,Ultra-compact micro-optical system for multispectral imaging, Feb. 22, 2018, California US, https://doi.org/10.1117/12.2295343, in English.
(Continued)

*Primary Examiner* — Md M Rahman
(74) *Attorney, Agent, or Firm* — Falk Ewers; Ewers IP Law PLLC (57) ABSTRACT

A device for a 3D measurement of object coordinates of a measurement object or parts of the measurement object in a coordinate measuring machine is provided. The device includes at least one illumination device configured to generate at least one illumination light beam and to illuminate the measurement object, at least one lens, wherein the lens has a longitudinal chromatic aberration, at least one color sensor arranged in an image plane of the lens, wherein the color sensor is configured to capture a measurement light beam generated by the measurement object in response to the illumination light beam and to determine at least one spectrally dependent image space content; at least one evaluation unit configured to determine at least one item of depth information from the spectrally dependent image space content.

10 Claims, 3 Drawing Sheets

(51) Int. Cl.
  *G02B 27/42* (2006.01)
  *G01J 3/28* (2006.01)
(58) Field of Classification Search
  USPC .......................................................... 356/402
  See application file for complete search history.

(56) References Cited

U.S. PATENT DOCUMENTS

2010/0099984 A1   4/2010  Graser
2017/0074644 A1*  3/2017  Arieli ..................... G01B 11/25

OTHER PUBLICATIONS

Office Action issued in German Patent Application No. DE 10 2019 208 114.2 (from which this application claims Priority), dated Feb. 15, 2021 and English language machine translation thereof.

* cited by examiner

DEVICE FOR 3D MEASUREMENT OF OBJECT COORDINATES

CROSS REFERENCE TO RELATED APPLICATIONS

This application claims priority to German patent application DE 10 2019 208 114.2, filed Jun. 4, 2019, the entire content of which is incorporated herein by reference.

TECHNICAL FIELD

The disclosure relates to a device for a 3D measurement of object coordinates, a method for the 3D measurement of object coordinates of a measurement object or parts of the measurement object, a computer program and a computer program product. The present disclosure relates, in particular, to the field of coordinate measuring technology.

BACKGROUND

In optical coordinate measuring machines, increasingly and to supplement detection of geometry, detection of the color of the articles to be measured is desired. Compromises are regularly made here since a high resolution, a fast measurement, a low outlay on apparatus and high color fidelity cannot be achieved simultaneously in a straightforward way.

Moreover, the so-called color systems are usually RGB (red, green and blue) systems constituting a color separation system. RGB systems may be able to represent the color impression for the human eye in many cases. However, these systems do not permit an actually complete detection of the color space or of the behavior of a sample in the color space.

SUMMARY

Therefore, a problem addressed by the present disclosure is that of providing a device for the 3D measurement of object coordinates, a method for the 3D measurement of object coordinates of a measurement object or parts of the measurement object, a computer program and a computer program product which at least largely avoid the disadvantages of known devices and methods. In particular, the intention is to enable a simultaneous 3D measurement of measurement objects at different distances or parts of a measurement object at different distances with high resolution.

This problem is solved by a device for the 3D measurement of object coordinates, a method for the 3D measurement of object coordinates of a measurement object or parts of the measurement object, a computer program and a computer program product as described herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" can refer both to the situation in which no further element aside from B is provided in A (that is to say to a situation in which A consists exclusively of B) and to the situation in which, in addition to B, one or more further elements are provided in A, for example element C, elements C and D, or even further elements. Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "typically", "in particular", "According to an exemplary embodiment" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the disclosure, as will be recognized by a person skilled in the art, can also be carried out using other configurations. Similarly, features introduced by "in one embodiment of the disclosure" or by "in one exemplary embodiment of the disclosure" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

In a first aspect of the present disclosure, a device for the 3D measurement of object coordinates of a measurement object or parts of the measurement object in a coordinate measuring machine is provided.

In this case, a measurement object can generally be understood in the context of the present disclosure to mean an object to be measured that has any shape. According to an exemplary embodiment, the measurement object can be selected from the group consisting of a test specimen, a workpiece to be measured, and a component to be measured, for example a motor vehicle. Other measurement objects are also conceivable, however. In particular, the measurement object can be a planar measurement object, for example having at least one extensive surface. The surface can be at least partly reflective. Partly reflective can be understood to mean that the surface of the measurement object is configured to specularly reflect and/or to return at least one portion of an illumination light beam. The measurement object can have a plurality of surfaces and/or parts, which can be arranged at different depths and/or in different planes, for example along a z-coordinate or longitudinal coordinate.

The term "object coordinate" as used here is a broad term which is intended to be accorded its customary and familiar meaning as understood by the person skilled in the art. The term is not restricted to a specific or adapted meaning. The term can refer, without restriction, in particular to at least one x-, y-, or z-coordinate of the measurement object, wherein the x- and y-coordinates are referred to as transverse coordinates and the z-coordinate is referred to as a longitudinal coordinate, distance coordinate or depth coordinate. The device, in particular a lens of the device described further below, can have an optical axis. One or more coordinate systems can be used for this purpose. According to an exemplary embodiment, a Cartesian coordinate system or a spherical coordinate system can be used. Other coordinate systems are also conceivable. A determination of a coordinate can be understood to mean, in particular, a determination of a distance between the respective determination location of the measurement object and the device, for example a distance between the respective determination location of the measurement object and at least one element of the device, in particular the lens.

The term "3D measurement" as used here is a broad term which is intended to be accorded its customary and familiar meaning as understood by the person skilled in the art. The term is not restricted to a specific or adapted meaning. The term can refer, without restriction, in particular to a determination of the z-coordinate of a determination location on at least one surface of the measurement object. Furthermore, a determination of the transverse coordinates can additionally be effected. In the context of the present disclosure, the expression "determination location" can be understood to mean a fundamentally arbitrary location, in particular a point or an area, on the surface to be measured of the measurement object at which a determination of a longitudinal coordinate is carried out. According to an exemplary embodiment, a determination location can be a measurement point on the surface of the measurement object.

The term "coordinate measuring machine" as used here is a broad term which is intended to be accorded its customary and familiar meaning as understood by the person skilled in the art. The term is not restricted to a specific or adapted meaning. The term can refer, without restriction, in particular to a device in the technical field of industrial metrology, which is configured to scan the measurement object, in particular a surface of a workpiece. The coordinate measuring machine can be configured such that it is of gantry, stand or bridge design. The coordinate measuring machine can comprise a measurement table for bearing the at least one measurement object. The coordinate measuring machine can comprise at least one gantry which comprises at least one first vertical column, at least one second vertical column and a cross beam which connects the first vertical column and the second vertical column. At least one vertical column selected from the first and second vertical columns can be mounted so as to be movable in a horizontal direction on the measurement table. The horizontal direction can be a direction along a y-axis. The coordinate measuring machine can have a coordinate system, for example a Cartesian coordinate system or a spherical coordinate system. Other coordinate systems are also conceivable. An origin or zero point of the coordinate system can be defined for example by a sensor of the coordinate measuring machine. An x-axis can run perpendicular to the y-axis in a plane of the bearing surface of the measuring table. A z-axis can extend perpendicular to the plane of the bearing surface, in a vertical direction. The vertical columns can extend along the z-axis. The cross beam can extend along the x-axis. The coordinate measuring machine can have at least one measuring slide which is mounted so as to be movable along the cross beam. A measuring slide can be understood generally to mean a slide which is configured to accommodate the device for the 3D measurement of object coordinates directly or with further components. The movement of the elements of the coordinate measuring machine can be operated and/or set and/or adjusted manually and/or automatically. The coordinate measuring machine can have at least one drive, for example at least one motor. The coordinate measuring machine can have a control unit configured to carry out, in a mechanized and automated manner, displacements of the sensor system in relation to the workpiece to be measured. The control unit can furthermore comprise at least one interface, for example an electronic interface and/or a human-machine interface, for example an input/output device such as a display and/or a keyboard and/or an operating console. The coordinate measuring machine can be configured to scan the measurement object, in particular a surface of the workpiece, with the device for the 3D measurement of object coordinates by way of movement of the gantry and/or of the measuring slide in all three spatial directions. The device for the 3D measurement of object coordinates can comprise at least one probe head, for example. The device for the 3D measurement of object coordinates can be configured to generate at least one signal, for example an electronic signal. The coordinate measuring machine can furthermore have at least one evaluation unit configured to evaluate the signal generated by the device for the 3D measurement of object coordinates and to generate from the signal 3D information about a measurement point on the surface of the measurement object.

The device comprises:

at least one illumination device configured to generate at least one illumination light beam and to illuminate the measurement object, at least one lens, wherein the lens has a longitudinal chromatic aberration, at least one color sensor arranged in an image plane of the lens, wherein the color sensor is configured to capture a measurement light beam generated by the measurement object in response to the illumination light beam and to determine at least one spectrally dependent image space content, and at least one evaluation unit configured to determine at least one item of depth information from the spectrally dependent image space content.

The device comprises the at least one illumination device configured to generate the at least one illumination light beam and to illuminate the measurement object. In the context of the present disclosure, an "illumination device" can be understood to mean an arbitrary device which is configured to generate at least one light beam. The illumination device can be configured to illuminate the measurement object sequentially or simultaneously with at least two wavelengths. The illumination device can have at least one light source. The illumination device can have at least one monochromatic light source configured to generate the illumination light beam with one wavelength. The illumination device can have a plurality of monochromatic light sources, wherein each of the light sources is configured to generate light of a different wavelength. The monochromatic light sources can be configured to illuminate the measurement object successively or simultaneously. The illumination device can have at least one polychromatic light source and/or at least one white light source and/or at least one spectrally broadband light source. The light source can have a wide and uniformly distributed spectral density. In the context of the present disclosure, "to illuminate the measurement object" can be understood to mean that the illumination device is configured to illuminate the measurement object or parts of the measurement object, in particular a point or an area on a surface of the measurement object. The illumination device can furthermore have at least one further optical element, in particular a lens element, which is configured to focus the light beam generated by the light source.

In the context of the present disclosure, "light" can be understood to mean electromagnetic radiation in at least one spectral range selected from the visible spectral range, the ultraviolet spectral range and the infrared spectral range. The term visible spectral range encompasses, in principle, a range of 380 nm to 780 nm. The term infrared (IR) spectral range encompasses, in principle, a range of 780 nm to 1000 μm, wherein the range of 780 nm to 1.4 μm is designated as near infrared (NIR), and the range of 15 μm to 1000 μm is designated as far infrared (FIR). The term ultraviolet encompasses, in principle, a spectral range of 100 nm to 380 nm. Visible light, that is to say light from the visible spectral range, is typically used in the context of the present disclosure. The term "light beam" can be understood to mean, in principle, a quantity of light which is emitted and/or radiated in a specific direction. The light beam can be a beam of rays. The term "illumination light beam" can be understood to mean a light beam which illuminates the measurement object, in particular the surface of the measurement object.

The device further comprises the at least one lens. The term "lens" as used here is a broad term which is intended to be accorded its customary and familiar meaning as understood by the person skilled in the art. The term is not restricted to a specific or adapted meaning. The term can refer, without restriction, in particular to an optical system, in particular an optical system that effects real imaging, having at least one optical element. The lens can have a plurality of lens elements and/or lens-element groups. A "lens-element group" can be understood to mean an optical element having at least two lens elements. The lens can have at least one diffractive lens element.

The lens can be configured as a chromatic lens, in particular. The lens can have chromatically aberrational properties. The expression "chromatically aberrational" properties can be understood to mean that the lens is configured to separate portions of the illumination light beam in a wavelength-dependent manner, or to have different imaging properties for different wavelengths. The lens has a longitudinal chromatic aberration, also called axially chromatic aberration. A "longitudinal chromatic aberration" can be understood to mean an imaging property such that portions of a light beam having different wavelengths are focused at respectively different focal points depending on the wavelength. The lens can be configured to generate a color- and distance-dependent focal position of the illumination light beam. In particular, the lens can be configured to sharply image measurement objects or parts of the measurement object located at different distances from the lens with different colors in each case into the image plane. The lens can be configured always to image all object space contents for all colors. In this case, however, the imaging cannot be effected sharply for all object space contents for all colors if they are at different distances in the object space. The lens can be telecentric on the image side and/or telecentric on the object side. In this case, the term "on the object side" refers to the measurement object to be measured. "Telecentric on the object side" can be understood to mean that on the object side the chief rays run parallel to the optical axis. "Telecentric on the image side" can be understood to mean that on the image side the chief rays run parallel to the optical axis. The device, in particular the lens, can be configured to generate an extended depth of focus (EDOF).

The device comprises at least one color sensor arranged in an image plane of the lens. The term "color sensor" as used here is a broad term which is intended to be accorded its customary and familiar meaning as understood by the person skilled in the art. The term is not restricted to a specific or adapted meaning. The term can refer, without restriction, in particular to a sensor configured for selectively detecting and determining a spectral range, in particular the visible spectral range. The color sensor can have a plurality of spectral channels. The term "spectral channel" as used here is a broad term which is intended to be accorded its customary and familiar meaning as understood by the person skilled in the art. The term is not restricted to a specific or adapted meaning. The term can refer, without restriction, in particular to a recording channel of the color sensor. The spectral channels can be distributed over a spectral range, for example from the visible to the near infrared. The spectral channels can be distributed for example in a spectral range of 400 nm to 1000 nm. The spectral channels can be distributed in particular equidistantly in the spectral range. According to an exemplary embodiment, the color sensor can be an RGB sensor having three spectral channels, namely red, green and blue. The color sensor can have at least one hyperspectral sensor. The color sensor can have at least four spectral channels, typically at least eight spectral channels, particularly typically at least 25 spectral channels. The more channels the color sensor has, the higher the spectral resolution. A respective spectral channel can have a specific bandwidth, in particular a full width at half maximum (FWHM). According to an exemplary embodiment, the bandwidth can be less than 20 nm, typically less than 10 nm, particularly typically less than 5 nm, in the visible spectral range through to the near infrared. The color sensor can be a pixelated sensor. The color sensor can have for example a sensor element comprising a matrix of pixels, for example a square or rectangular or circular matrix. Other shapes are also conceivable. The color sensor can have a plurality of pixels for each spectral channel. According to an exemplary embodiment, the color sensor can comprise a CMOS or CCD sensor. According to an exemplary embodiment, the color sensor can have eight spectral channels and 256×256 pixels per spectral channel. According to an exemplary embodiment, the color sensor can have four spectral channels and 512×512 pixels per spectral channel. Other numbers are also conceivable. According to an exemplary embodiment, the color sensor can be configured as a hyperspectral sensor available under the designation msCAM™ Camera from Spectral Devices Inc., for example as an "8-band NIR camera" or as a "4-band agriculture camera".

The color sensor is configured to capture a measurement light beam generated by the measurement object in response to the illumination light beam and to determine at least one spectrally dependent image space content. The term "spectrally dependent image space content" as used here is a broad term which is intended to be accorded its customary and familiar meaning as understood by the person skilled in the art. The term is not restricted to a specific or adapted meaning. The term can refer, without restriction, in particular to a light intensity of the respective wavelength in the image plane, which light intensity is detected by the color sensor. The color sensor can be configured to capture the measurement light beams generated by the measurement object and to generate an image, wherein each of the image pixels, also called image coordinates, has a recorded light intensity for the respective spectral channels.

The device comprises the at least one evaluation unit. In this case, "an evaluation unit" can generally be understood to mean an electronic device configured to evaluate signals generated by the color sensor. According to an exemplary embodiment, one or more electronic connections between the color sensor and the evaluation unit can be provided for this purpose. The evaluation unit can comprise for example at least one data processing device, for example at least one computer or microcontroller. The data processing device can have one or more volatile and/or non-volatile data memories, wherein the data processing device can for example be configured, in terms of programming technology, to actuate the color sensor. The evaluation unit can furthermore comprise at least one interface, for example an electronic interface and/or a human-machine interface such as, for example, an input/output device such as a display and/or a keyboard. The evaluation unit can be constructed for example centrally or else in a decentralized manner. Other configurations are also conceivable. The evaluation unit can be wholly or partly integrated in the color sensor. The color sensor can be connected to the evaluation unit for example directly or indirectly. Alternatively or additionally, however, the evaluation unit can also be arranged wholly or partly at the location of the color sensor, for example in the form of a microcontroller, and/or can be integrated wholly or partly into the color sensor.

The evaluation unit is configured to determine at least one item of depth information from the spectrally dependent image space content. The evaluation unit can be configured to evaluate the spectrally dependent image space content using at least one image processing method. The image processing method can use at least one algorithm configured to assign a depth coordinate to at least one image coordinate of the spectrally dependent image space content. The evaluation unit can be configured to determine for each pixel a spectral intensity distribution of the measurement light beams and to determine a longitudinal coordinate of the respective determination location of the measurement object from the respective spectral intensity distribution. A "spectral intensity distribution" can be understood to mean a distribution of the intensity of the measurement light beam as a function of the wavelength. The evaluation unit can be configured, particularly with known properties of the lens, to assign a depth coordinate to the spectral channel determined. The evaluation unit can be configured to determine for the at least one image coordinate of the spectrally dependent image space content that spectral channel which has a maximum light intensity. The evaluation unit can be configured for example to determine a maximum of the respective spectral intensity distribution, to assign a wavelength and to determine the longitudinal coordinate of the determination location of the measurement object from the assigned wavelength.

In the case where the measurement object is illuminated simultaneously with a plurality of illumination light beams, a superimposition of the different images of the respective wavelength and an unsharp imaging can occur without color filtering upstream of the color sensor. This can be prevented by sequential switching of the light sources and subsequent computation of the images.

In the case of illumination with white light, that is to say with a continuous spectrum, the distance-dependently sharply imaged parts of the measurement object from the depth of field range associated with the respective spectral channel are sharply imaged with the color sensor. The evaluation unit can be configured to identify the respectively sharply imaged parts of the measurement object with image processing methods. The evaluation unit can be configured to assign the identified parts of the measurement object to a wavelength and thus to determine a depth coordinate. This can be done simultaneously for all the spectral channels. However, the color sensor can represent a significant undersampling of the image space depending on the number of spectral channels. This can also be intensified by the technological necessities in the production of filter arrays, which can have the result that filter cells must correspond to 2×2 pixels of the color sensor, for example. In order to optimally utilize the resolution capability of the optical system, the device can be configured to determine the spectrally dependent image space content at at least two different relative positions of the measurement object with respect to the device. According to an exemplary embodiment, an offset of the measurement object in relation to the lens can be used to perform a measurement of the measurement object at at least two relative distances between measurement object and device. The device can be configured to carry out a measurement of the measurement object at a plurality of relative positions of the measurement object with respect to the device and to generate an image stack. The evaluation unit can be configured to evaluate the image stack generated. The evaluation unit can be configured to generate a super-resolved overall image from the individual images of the image stack, which can have a low resolution as described above. Such methods for image processing are known to the person skilled in the art, for example from U.S. Pat. No. 8,577,184 B2. In the context of the present disclosure, an "overall image" can be understood to mean an image that is generated, in particular constituted, from the individual images of the image stack. A "super-resolved" overall image can be understood to mean that the overall image has a higher resolution than the resolution of the individual images. According to an exemplary embodiment, a movement of the measurement object can be used, which movement is carried out during processing of various measurement tasks in a test plan with an optical coordinate measuring machine. Displacements within the resulting image stacks from the coordinate measuring machine may be known with very great accuracy in 3D or even 6D, such that the super-resolved overall image can be determined with great accuracy. The device can achieve a higher spatial resolution and simultaneous coverage of the entire visible spectral range by the use of image processing methods for so-called super-resolution and hyperspectral image capture.

The device can have at least two measurement channels. At least one first measurement channel can have the color sensor. At least one second measurement channel can have a monochromatic imaging device. In the context of the present application, a "measurement channel" can be understood to mean a beam path in which at least one optical measurement, in particular an imaging, is carried out. The first and second measurement channels can be configured to carry out an optical measurement independently of one another. The first measurement channel can be a beam path with hyperspectral but spatially low resolution. The second measurement channel can be a narrowband, in particular monochromatic, high resolution beam path. According to an exemplary embodiment, a ratio of the numerical apertures of the two beam paths can be five or more. The numerical aperture of the second measurement channel can be 0.1 to 0.3. The numerical aperture of the first measurement channel can accordingly be 0.05 or lower. The monochromatic imaging device can comprise at least one camera. The color sensor and/or the monochromatic imaging device can have a frame rate of greater than or equal to 60 Hz. In customary devices and methods, different distances between object surface and lens may be necessary during a recording of image sequences of different object surface regions for general topographies since otherwise sharp imaging is not possible if the depth of the object plane is greater than the depth of focus. The first measurement channel can be configured to determine an overview containing topography information. A combination of such a hyperspectral overview beam path with a high resolution monochromatic beam path can allow the feed correction of the lens to be ascertained within image sequences of different object segments from the topography information of the respectively preceding image, such that the succeeding image is immediately sharp without a focusing cycle. Obviation of the need for focusing cycles and an associated continuous measurement movement of the measuring machine relative to the measurement object can mean a drastic increase in productivity.

In a further aspect, a method for the 3D measurement of object coordinates of a measurement object or parts of the measurement object is provided. A device according to an aspect of the disclosure according to one of the exemplary embodiments described above or further below is used in the method. The method comprises the following method steps:

generating at least one illumination light beam with at least one illumination device of the device and illuminating the measurement object, wherein the device comprises at least one lens having a longitudinal chromatic aberration, capturing at least one measurement light beam generated by the measurement object in response to the illumination light beam with at least one color sensor of the device and determining at least one spectrally dependent image space content, wherein the color sensor is arranged in an image plane of the lens, and determining at least one item of depth information from the spectrally dependent image space content with an evaluation unit of the device.

In this case, the method steps can be carried out in the order specified, wherein one or more of the steps can at least partly also be carried out simultaneously and wherein one or more of the steps can be multiply repeated. Furthermore, further steps can additionally be performed independently of whether or not they are mentioned in the present application. A device according to an aspect of the disclosure for the 3D measurement of object coordinates is used in the method. For details in respect of the method according to an aspect of the disclosure, reference is made to the description of the device according to an aspect of the disclosure.

The device according to an aspect of the disclosure and the method according to an aspect of the disclosure are advantageous by comparison with known methods and devices. By virtue of a use of a color sensor, a spectral image capture, in particular a hyperspectral image capture, can be effected and it can thus be possible to capture different object planes in one measurement. Moreover, a super-resolution can be achieved with the image processing methods described above.

Furthermore, in the context of the present disclosure, a computer program is provided, which, when executed on a computer or computer network, carries out the method according to an aspect of the disclosure, in particular method steps ii) to iii), in one of its configurations.

Furthermore, in the context of the present disclosure, a computer program comprising a program code is provided for carrying out the method according to the disclosure in one of its configurations when the program code is executed on a computer or computer network. In particular, the program code can be stored on a computer-readable data medium and/or a computer-readable storage medium.

The terms "computer-readable data medium" and "computer-readable storage medium" as used here can refer in particular to non-transitory data storage media, for example a hardware data storage medium on which computer-executable instructions are stored. The computer-readable data medium or the computer-readable storage medium can be or comprise, in particular, a storage medium such as a Random Access Memory (RAM) and/or a Read Only Memory (ROM).

Moreover, a data medium is provided within the scope of the present disclosure, a data structure being stored on such a data medium, said data structure, after being loaded into a random access memory and/or main memory of a computer or computer network, being configured to carry out the method according to an aspect of the disclosure in one of its configurations.

A computer program product comprising program code stored on a machine-readable medium is also provided within the scope of the present disclosure, for carrying out the method according to an aspect of the disclosure in one of its configurations when the program code is executed on a computer or computer network.

In this case, a computer program product is understood to mean the product as a commercially available product. In principle, it can be present in any form, for example on paper or on a computer-readable data medium, and, in particular, it can be distributed via a data transmission network.

Finally, a modulated data signal is provided within the scope of the present disclosure, said modulated data signal containing instructions that can be executed by a computer system or computer network, for carrying out a method according to any one of the exemplary embodiments described.

With regard to the computer-implemented aspects of the disclosure, one or a plurality of method steps, in particular method steps ii) to iii), of the method in accordance with one or more of the configurations provided here can be carried out with a computer or computer network.

Consequently, in general, any of the method steps, including the provision and/or manipulation of data, can be carried out with a computer or computer network. In general, these steps can comprise any of the method steps, excluding the steps that require manual work, for example the provision of samples and/or specific aspects of carrying out actual measurements.

In summary, without restriction of further possible configurations, the following exemplary embodiments are provided:

Exemplary Embodiment 1

Device for the 3D measurement of object coordinates of a measurement object or parts of the measurement object in a coordinate measuring machine, comprising:

at least one illumination device configured to generate at least one illumination light beam and to illuminate the measurement object, at least one lens, wherein the lens has a longitudinal chromatic aberration, at least one color sensor arranged in an image plane of the lens, wherein the color sensor is configured to capture a measurement light beam generated by the measurement object in response to the illumination light beam and to determine at least one spectrally dependent image space content, and at least one evaluation unit configured to determine at least one item of depth information from the spectrally dependent image space content.

Exemplary Embodiment 2

Device according to the preceding exemplary embodiment, wherein the color sensor has a plurality of spectral channels, wherein the color sensor has at least four spectral channels, typically at least eight spectral channels, particularly typically at least 25 spectral channels.

Exemplary Embodiment 3

Device according to either of the preceding exemplary embodiments, wherein the color sensor comprises at least one hyperspectral sensor and/or at least one RGB (red, green, blue) sensor.

Exemplary Embodiment 4

Device according to any of the preceding exemplary embodiments, wherein the color sensor has a plurality of pixels for each spectral channel.

Exemplary Embodiment 5

Device according to any of the preceding exemplary embodiments, wherein the illumination device is configured to illuminate the measurement object sequentially or simultaneously with at least two wavelengths.

Exemplary Embodiment 6

Device according to any of the preceding exemplary embodiments, wherein the illumination device has at least one polychromatic light source and/or at least one white light source and/or at least one broadband light source.

Exemplary Embodiment 7

Device according to any of the preceding exemplary embodiments, wherein the evaluation unit is configured to evaluate the spectrally dependent image space content using at least one image processing method, and wherein the image processing method uses at least one algorithm configured to assign a depth coordinate to at least one image coordinate of the spectrally dependent image space content.

Exemplary Embodiment 8

Device according to the preceding exemplary embodiment, wherein the evaluation unit is configured to determine for the at least one image coordinate of the spectrally dependent image space content that spectral channel which has a maximum light intensity, and wherein the evaluation unit is configured to assign a depth coordinate to the spectral channel determined.

Exemplary Embodiment 9

Device according to any of the preceding exemplary embodiments, wherein the lens is configured to generate a color- and distance-dependent focal position of the illumination light beam.

Exemplary Embodiment 10

Device according to any of the preceding exemplary embodiments, wherein the lens is configured to image measurement objects or parts of the measurement object located at different distances from the lens with different colors in each case into the image plane.

Exemplary Embodiment 11

Device according to any of the preceding exemplary embodiments, wherein the lens is telecentric on the image side and/or telecentric on the object side.

Exemplary Embodiment 12

Device according to any of the preceding exemplary embodiments, wherein the device is configured to determine the spectrally dependent image space content at at least two different relative positions of the measurement object with respect to the device.

Exemplary Embodiment 13

Device according to any of the preceding exemplary embodiments, wherein the device has at least two measurement channels, wherein at least one first measurement channel has the color sensor, and wherein at least one second measurement channel has a monochromatic imaging device.

Exemplary Embodiment 14

Method for the 3D measurement of object coordinates of a measurement object or parts of the measurement object, wherein a device according to any of the preceding exemplary embodiments is used in the method, an wherein the method comprises the following steps:

generating at least one illumination light beam with at least one illumination device of the device and illuminating the measurement object, wherein the device comprises at least one lens having a longitudinal chromatic aberration, capturing at least one measurement light beam generated by the measurement object in response to the illumination light beam with at least one color sensor of the device and determining at least one spectrally dependent image space content, wherein the color sensor is arranged in an image plane of the lens, and determining at least one item of depth information from the spectrally dependent image space content using an evaluation unit of the device.

Exemplary Embodiment 15

Computer program which, when executed on a computer or computer network, carries out the method according to the preceding exemplary embodiment, in particular method steps ii) to iii), in one of its configurations.

Exemplary Embodiment 16

Computer program product comprising program code stored on a machine-readable medium for carrying out the method according to the exemplary embodiment 13 when the program code is executed on a computer or computer network.

Further details and features will become apparent from the following description of exemplary embodiments. The respective features can be realized by themselves or as a plurality in combination with one another. The disclosure is not restricted to the exemplary embodiments. The exemplary embodiments are illustrated schematically in the figures. In this case, identical reference numerals in the individual figures designate identical or functionally identical elements or elements corresponding to one another with regard to their functions.

BRIEF DESCRIPTION OF THE DRAWINGS

The disclosure will now be described with reference to the drawings wherein.

DESCRIPTION OF EXEMPLARY EMBODIMENTS

Figure 1:
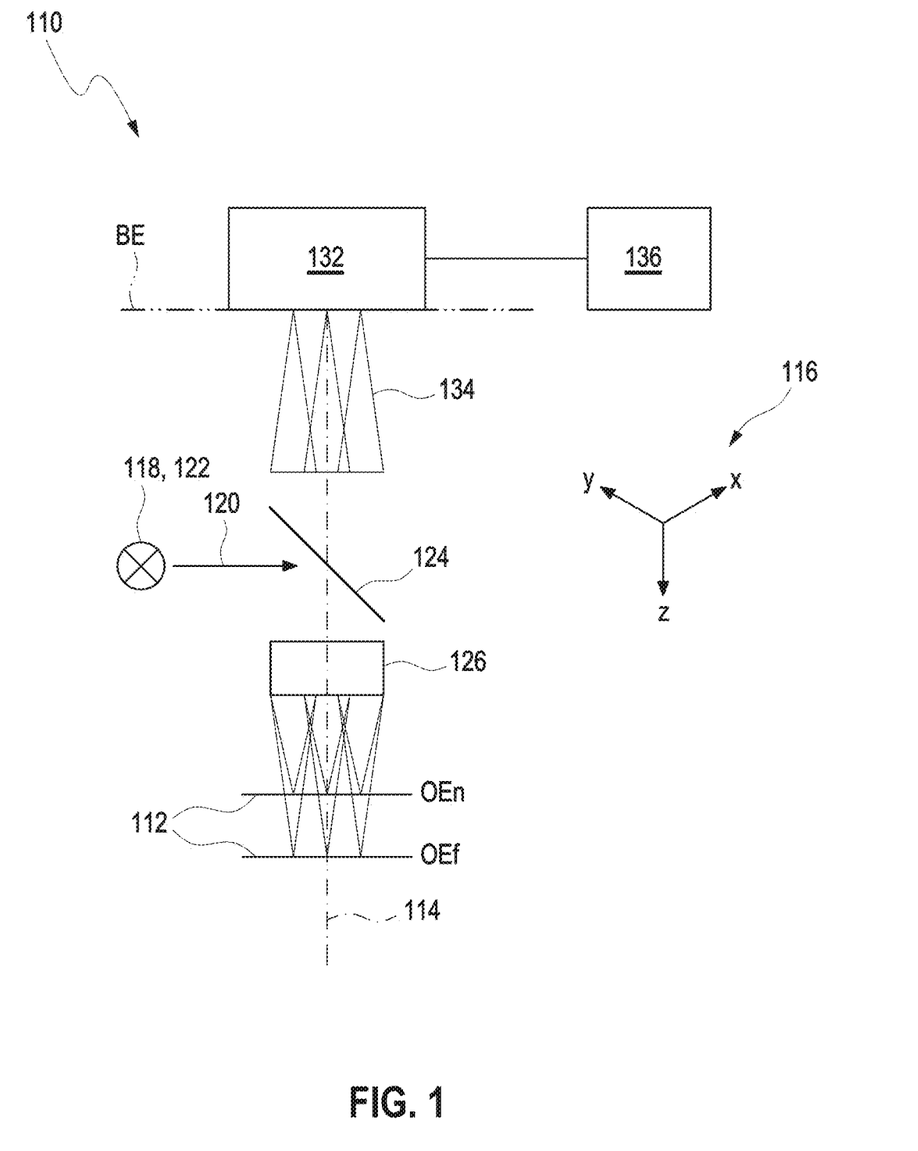
FIG. 1 shows a schematic illustration of a device for the 3D measurement of object coordinates according to an exemplary embodiment of the disclosure.

FIG. 1 shows, in a highly schematic illustration, one exemplary embodiment of a device 110 according to the disclosure for the 3D measurement of object coordinates of a measurement object 112 or parts of the measurement object 112 in a coordinate measuring machine (not illustrated here).

According to an exemplary embodiment, the measurement object 112 can be selected from the group consisting of a test specimen, a workpiece to be measured and a component to be measured, for example a motor vehicle. However, other measurement objects 112 are also conceivable. In particular, the measurement object 112 can be a planar measurement object, for example having at least one extensive surface. The surface can be at least partly reflective. The measurement object 112 can have a plurality of surfaces and/or parts, which can be arranged at different depths and/or in different planes, for example along a z-coordinate or longitudinal coordinate.

The object coordinate can be at least one x-, y-, or z-coordinate of the measurement object 112. The device 110 can have an optical axis 114. One or more coordinate systems can be used for this purpose. According to an exemplary embodiment, a Cartesian coordinate system 116 or a spherical coordinate system can be used. Other coordinate systems are also conceivable. The 3D measurement can comprise a determination of the z-coordinate of a determination location on the at least one surface of the measurement object 112. Furthermore, a determination of the transverse coordinates can additionally be effected.

The coordinate measuring machine can be configured such as a gantry, stand or bridge design. The coordinate measuring machine can comprise a measurement table for bearing the at least one measurement object 112. The coordinate measuring machine can comprise at least one gantry which comprises at least one first vertical column, at least one second vertical column and a cross beam which connects the first vertical column and the second vertical column. At least one vertical column selected from the first and second vertical columns can be mounted so as to be movable in a horizontal direction on the measurement table. The horizontal direction can be a direction along a y-axis. The coordinate measuring machine can have a coordinate system, for example a Cartesian coordinate system or a spherical coordinate system. Other coordinate systems are also conceivable. An origin or zero point of the coordinate system can be defined for example by a sensor of the coordinate measuring machine. An x-axis can run perpendicular to the y-axis in a plane of the bearing surface of the measuring table. A z-axis can extend perpendicular to the plane of the bearing surface, in a vertical direction. The vertical columns can extend along the z-axis. The cross beam can extend along the x-axis. The coordinate measuring machine can have at least one measuring slide which is mounted so as to be movable along the cross beam. The movement of the elements of the coordinate measuring machine can be operated and/or set and/or adjusted manually and/or automatically. The coordinate measuring machine can have at least one drive, for example at least one motor. The coordinate measuring machine can have a control unit configured to carry out, in a mechanized and automated manner, displacements of the sensor system in relation to the workpiece to be measured. The control unit can further comprise at least one interface, for example an electronic interface and/or a human-machine interface, for example an input/output device such as a display and/or a keyboard and/or an operating console. The coordinate measuring machine can be configured to scan the measurement object, in particular a surface of the workpiece, with the device 110 by way of movement of the gantry and/or of the measuring slide in all three spatial directions. The device 110 can comprise at least one probe head, for example. The device for the 3D measurement of object coordinates can be configured to generate at least one signal, for example an electronic signal. The coordinate measuring machine can further have at least one evaluation unit configured to evaluate the signal generated by the device 110 and to generate from the signal 3D information about a measurement point on the surface of the measurement object 112.

The device 110 comprises at least one illumination device 118 configured to generate the at least one illumination light beam 120 and to illuminate the measurement object 112. The illumination device 118 can be configured to illuminate the measurement object 112 sequentially or simultaneously with at least two wavelengths. The illumination device 118 can have at least one light source 122. The illumination device 118 can have at least one monochromatic light source configured to generate the illumination light beam 120 with one wavelength. The illumination device 118 can have a plurality of monochromatic light sources, wherein each of the light sources 122 is configured to generate light of a different wavelength. The monochromatic light sources can be configured to illuminate the measurement object 112 successively or simultaneously. The illumination device 118 can have at least one polychromatic light source and/or at least one white light source and/or at least one spectrally broadband light source. The light source 122 can have a wide and uniformly distributed spectral density. The illumination device 118 can be configured to illuminate the measurement object 112 or parts of the measurement object 112, in particular a point or an area on a surface of the measurement object 112. The illumination device 118 can furthermore have at least one further optical element, in particular a lens element, which is configured to focus the light beam generated by the light source. The device 110 can have at least one beam splitter 124 configured to direct the illumination light beam 120 onto the measurement object 112.

The device 110 comprises at least one lens 126. The lens 126 can have a plurality of lens elements 128 and/or lens-element groups 130. One example of a lens 126 according to an aspect of the disclosure is illustrated in FIG. 2. The lens 126 can be configured as a chromatic lens, in particular. The lens can have chromatically aberrational properties. The lens 126 has a longitudinal chromatic aberration, also called axially chromatic aberration. The lens 126 can be configured to generate a color- and distance-dependent focal position of the illumination light beam 120. FIG. 1 illustrates two different object planes (OE), wherein OEn identifies an object plane that is closer to the lens 126, and OEf identifies an object plane that is further away from the lens 126. In the exemplary embodiment shown in FIG. 1, the object planes OEn and OEf additionally indicate the depth of field range of the lens 126. In this case, the object plane OEn identifies a focal plane closest to the lens 126, for example of a blue color component of the illumination light beam 120, and the object plane OEf identifies a focal plane furthest away from the lens 126, for example of a red color component of the illumination light beam 120. In particular, the lens 126 can be configured to sharply image measurement objects 112 or parts of the measurement object 112 located at different distances from the lens 126 with different colors in each case into an image plane BE. The lens 126 can be telecentric on the image side and/or telecentric on the object side. The device 110, in particular the lens 126, can be configured to generate an extended depth of focus (EDOF).

Figure 2A:
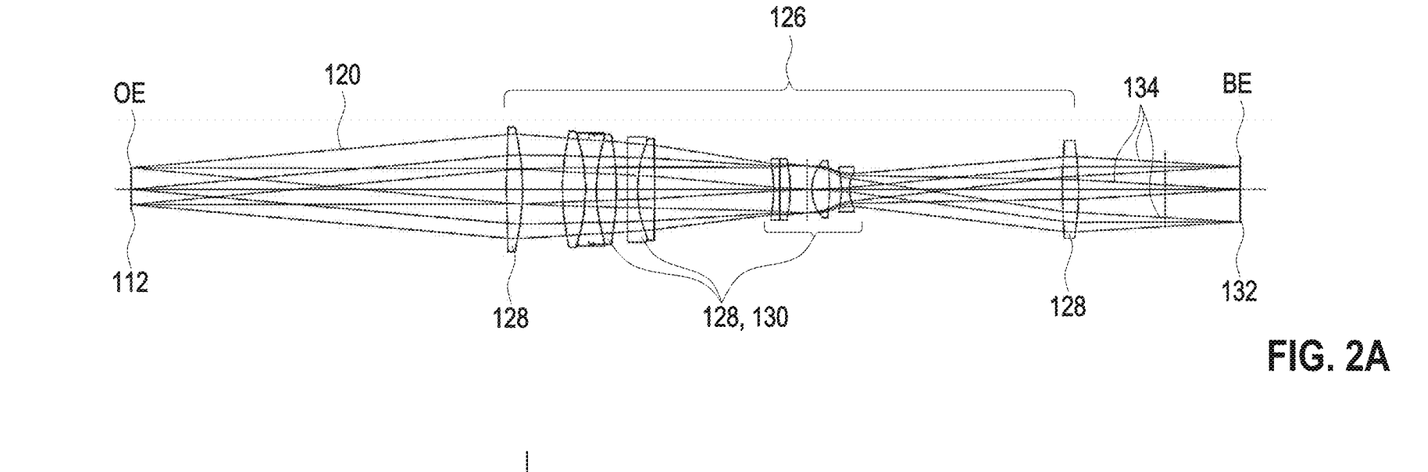
FIGS. 2A and 2B show schematic illustrations of a lens of the device and a simulation result for said lens according to an exemplary embodiment of the disclosure.
Figure 2B:
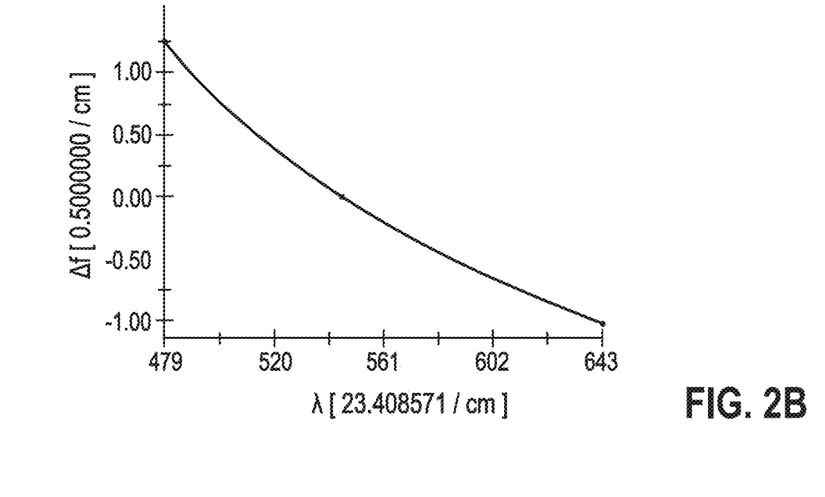

FIG. 2A shows a schematic illustration of one exemplary embodiment of a lens 126 that is telecentric on both sides in each case for axial rays, paraxial rays and for marginal rays. The lens 126 can have a plurality of lens elements 128 and/or lens-element groups 130 arranged along the optical axis 114. According to an exemplary embodiment, the lens can have a plurality of convex and/or concave lens elements. The lens 126 has a longitudinal chromatic aberration, illustrated in FIG. 2B. FIG. 2B shows a simulation result for this lens 126, namely the focal position $\Delta f$ in mm in the object plane as a function of the wavelength $\lambda$ respectively for axial rays, paraxial rays and for marginal rays. FIG. 2B shows a wavelength-dependent focal position.

The device 110 comprises, as illustrated in FIG. 1, at least one color sensor 132 arranged in the image plane BE of the lens 126. The color sensor 132 can be configured for selectively detecting and determining a spectral range, in particular the visible spectral range. The color sensor 132 can have a plurality of spectral channels. The spectral channels can be distributed over a spectral range, for example from the visible to the near infrared. The spectral channels can be distributed for example in a spectral range of 400 nm to 1000 nm. The spectral channels can be distributed in particular equidistantly in the spectral range. According to an exemplary embodiment, the color sensor 132 can be an RGB sensor having three spectral channels, namely red, green and blue. The color sensor 132 can have at least one hyperspectral sensor. The color sensor 132 can have at least four spectral channels, typically at least eight spectral channels, particularly typically at least 25 spectral channels. The more channels the color sensor 132 has, the higher the spectral resolution. A respective spectral channel can have a specific bandwidth, in particular a full width at half maximum (FWHM). According to an exemplary embodiment, the bandwidth can be less than 20 nm, typically less than 10 nm, particularly typically less than 5 nm, in the visible spectral range through to the near infrared. The color sensor 132 can be a pixelated sensor. The color sensor 132 can have for example a sensor element comprising a matrix of pixels, for example a square or rectangular or circular matrix. Other shapes are also conceivable. The color sensor 132 can have a plurality of pixels for each spectral channel. According to an exemplary embodiment, the color sensor 132 can comprise a CMOS or CCD sensor. According to an exemplary embodiment, the color sensor 132 can have eight spectral channels and 256×256 pixels per spectral channel. According to an exemplary embodiment, the color sensor 132 can have four spectral channels and 512×512 pixels per spectral channel. Other numbers are also conceivable. According to an exemplary embodiment, the color sensor 132 can be configured as a hyperspectral sensor available under the designation msCAM™ Camera from Spectral Devices Inc., for example as an "8-band NIR camera" or as a "4-band agriculture camera".

The color sensor 132 is configured to capture a measurement light beam 134 generated by the measurement object 112 in response to the illumination light beam 120 and to determine at least one spectrally dependent image space content. The color sensor 132 can be configured to capture the measurement light beams 134 generated by the measurement object 112 and to generate an image, wherein each of the image pixels, also called image coordinates, has a recorded light intensity for the respective spectral channels.

The device 110 comprises at least one evaluation unit 136. The evaluation unit 136 can be configured to evaluate signals generated by the color sensor 132. According to an exemplary embodiment, one or more electronic connections between the color sensor 132 and the evaluation unit 136 can be provided for this purpose. The evaluation unit 136 can comprise for example at least one data processing device, for example at least one computer or microcontroller. The data processing device can have one or more volatile and/or non-volatile data memories, wherein the data processing device can for example be configured, in terms of programming technology, to actuate the color sensor 132. The evaluation unit 136 can further comprise at least one interface, for example an electronic interface and/or a human-machine interface such as, for example, an input/output device such as a display and/or a keyboard. The evaluation unit 136 can be constructed for example centrally or else in a decentralized manner. Other configurations are also conceivable. The evaluation unit 136 can be wholly or partly integrated in the color sensor 132. The color sensor 132 can be connected to the evaluation unit 136 for example directly or indirectly. Alternatively or additionally, however, the evaluation unit 136 can also be arranged wholly or partly at the location of the color sensor 132, for example in the form of a microcontroller, and/or can be integrated wholly or partly into the color sensor 132.

The evaluation unit 136 is configured to determine at least one item of depth information from the spectrally dependent image space content. The evaluation unit 136 can be configured to evaluate the spectrally dependent image space content using at least one image processing method. The image processing method can use at least one algorithm configured to assign a depth coordinate to at least one image coordinate of the spectrally dependent image space content. The evaluation unit 136 can be configured to determine for each pixel a spectral intensity distribution of the measurement light beams 134 and to determine a longitudinal coordinate of the respective determination location of the measurement object 112 from the respective spectral intensity distribution. The evaluation unit 136 can be configured, particularly with known properties of the lens 126, to assign a depth coordinate to the spectral channel determined. The evaluation unit 136 can be configured to determine for the at least one image coordinate of the spectrally dependent image space content that spectral channel which has a maximum light intensity. The evaluation unit 136 can be configured for example to determine a maximum of the respective spectral intensity distribution, to assign a wavelength and to determine the longitudinal coordinate of the determination location of the measurement object 112 from the assigned wavelength. In addition, or as an alternative to searching for the spectral intensity maximum, however, it is also possible to carry out a spectrally dependent analysis of the Fourier content of the image space in order to extract the object space height information for the correspondingly analyzed image space region.

In the case where the measurement object 112 is illuminated simultaneously with a plurality of illumination light beams 120, a superimposition of the different images of the respective wavelength and an unsharp imaging can occur without color filtering upstream of the color sensor 132. This can be prevented by sequential switching of the light sources 122 and subsequent computation of the images.

In the case of illumination with white light, that is to say with a continuous spectrum, the distance-dependently sharply imaged parts of the measurement object 112 from the depth of field range associated with the respective spectral channel are sharply imaged with the color sensor 132. The evaluation unit 136 can be configured to identify the respectively sharply imaged parts of the measurement object 112 with image processing methods. The evaluation unit 136 can be configured to assign the identified parts of the measurement object 112 to a wavelength and thus to determine a depth coordinate. This can be done simultaneously for all the spectral channels. However, the color sensor 132 can represent a significant undersampling of the image space depending on the number of spectral channels. This can also be intensified by the technological necessities in the production of filter arrays, which can have the result that filter cells must correspond to 2×2 pixels of the color sensor 132, for example. In order to optimally utilize the resolution capability of the optical system, the device 110 can be configured to determine the spectrally dependent image space content at at least two different relative positions of the measurement object 112 with respect to the device 110. According to an exemplary embodiment, an offset of the measurement object 112 in relation to the lens 126 can be used to perform a measurement of the measurement object 112 at at least two relative distances between measurement object 112 and device 110. The device 110 can be configured to carry out a measurement of the measurement object 112 at a plurality of relative positions of the measurement object 112 with respect to the device and to generate an image stack. The evaluation unit 136 can be configured to evaluate the image stack generated. The evaluation unit 136 can be configured to generate a super-resolved overall image from the individual images of the image stack, which can have a low resolution as described above. Such methods for image processing are known to a person skilled in the art, for example from U.S. Pat. No. 8,577,184 B2. According to an exemplary embodiment, a movement of the measurement object 112 can be used, which movement is carried out during processing of various measurement tasks in a test plan with an optical coordinate measuring machine. Displacements within the resulting image stacks from the coordinate measuring machine may be known with very great accuracy in 3D or even 6D, such that the super-resolved overall image can be determined with great accuracy. The device 110 can achieve a higher spatial resolution and simultaneous coverage of the entire visible spectral range by the use of image processing methods for so-called super-resolution and hyperspectral image capture.

Figure 3:
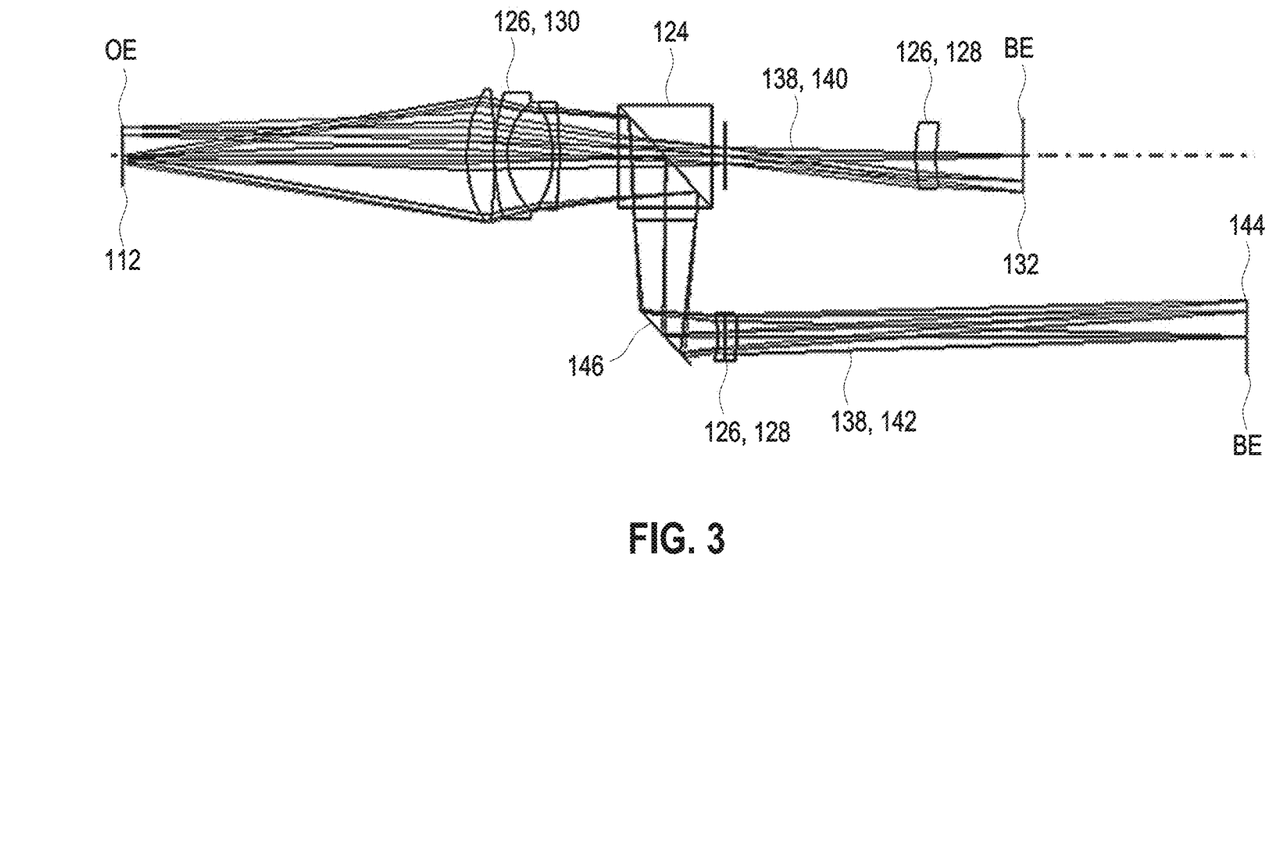
FIG. 3 shows a further schematic illustration of a further exemplary embodiment of a lens of the device according to an exemplary embodiment of the disclosure.

FIG. 3 shows a further exemplary embodiment of the device 110 according to the disclosure. The device 110 can have at least two measurement channels 138. At least one first measurement channel 140 can have the color sensor 132. With regard to the configuration of the first measurement channel 140, reference can be made to the description concerning FIGS. 1 and 2. At least one second measurement channel 142 can have a monochromatic imaging device 144. The first measurement channel 140 and the second measurement channel 142 can be configured to carry out an optical measurement independently of one another, in particular to image the measurement object 112 or a part of the measurement object 112. The first measurement channel 140 can be a beam path with hyperspectral but spatially low resolution. The second measurement channel 142 can be a narrowband, in particular monochromatic, high resolution beam path. According to an exemplary embodiment, a ratio of the numerical apertures of the two beam paths can be five or more. The numerical aperture of the second measurement channel 142 can be 0.1 to 0.3. The numerical aperture of the first measurement channel 140 can accordingly be 0.05 or lower. The monochromatic imaging device 144 can comprise at least one camera. The color sensor 132 and/or the monochromatic imaging device 144 can have a frame rate of greater than or equal to 60 Hz. The device 110 can have the beam splitter 124, which in this exemplary embodiment is configured to split a light beam emanating from the measurement object 112 into the first measurement channel 140 and the second measurement channel 142. Furthermore, provision can be made of at least one beam deflection device 146 in the first measurement channel 140 and/or the second measurement channel 142, for example one or more mirrors configured to direct the beams onto the color sensor 132 and/or the imaging device 144. In customary devices and methods, different distances between object surface and lens may be necessary during a recording of image sequences of different object surface regions for general topographies since otherwise sharp imaging is not possible if the depth of the object plane is greater than the depth of focus. The first measurement channel 140 can be configured to determine an overview containing topography information. A combination of such a hyperspectral overview beam path with a high resolution monochromatic beam path can allow the feed correction of the lens 126 to be ascertained within image sequences of different object segments from the topography information of the respectively preceding image, such that the succeeding image is immediately sharp without a focusing cycle. Obviation of the need for focusing cycles and an associated continuous measurement movement of the measuring machine relative to the measurement object 112 can mean a drastic increase in productivity.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

110 Device
112 Measurement object
114 Optical axis
116 Coordinate system
118 Illumination device
120 Illumination light beam
122 Light source
124 Beam splitter
126 Lens
128 Lens elements
130 Lens-element group
132 Colour sensor
134 Measurement light beam
136 Evaluation unit
138 Measurement channel
140 First measurement channel
142 Second measurement channel
144 Imaging device
146 Beam deflection device
OE Object plane
BE Image plane

What is claimed is:

1. A device for a 3D measurement of object coordinates of a measurement object or parts of the measurement object in a coordinate measuring machine, the device comprising:
   at least one illumination device configured to generate at least one illumination light beam and to illuminate the measurement object;
   at least one lens, wherein the at least one lens has a longitudinal chromatic aberration;
   at least one color sensor arranged in an image plane of the at least one lens, wherein the at least one color sensor is configured to capture a measurement light beam generated by the measurement object in response to the at least one illumination light beam and to determine at least one spectrally dependent image space content; and
   at least one evaluation unit configured to determine at least one item of depth information from a spectrally dependent image space content.

2. The device according to claim 1, wherein:
   the at least one color sensor has a plurality of spectral channels, and
   the at least one color sensor has at least one of (a) at least four spectral channels, (b) at least eight spectral channels, and (c) at least 25 spectral channels.

3. The device according to claim 1, wherein the at least one color sensor includes at least one of (a) at least one hyperspectral sensor, and (b) at least one red, green, blue (RGB) sensor.

4. The device according to claim 1, wherein:
   the at least one evaluation unit is configured to evaluate the spectrally dependent image space content with at least one image processing method, and
   the at least one image processing method includes at least one algorithm configured to assign a depth coordinate to at least one image coordinate of the spectrally dependent image space content.

5. The device according to claim 1, wherein the at least one evaluation unit is configured to:
   determine for at least one image coordinate of the spectrally dependent image space content that spectral channel which has a maximum light intensity, and
   assign a depth coordinate to the spectral channel determined.

6. The device according to claim 1, wherein the device is configured to determine the spectrally dependent image space content at at least two different relative positions of the measurement object with respect to the device.

7. The device according to claim 1, wherein:
   the device has at least two beam paths,
   at least one first beam path includes the at least one color sensor, and
   at least one second beam path includes a monochromatic imaging device.

8. A method for the 3D measurement of the object coordinates of the measurement object or parts of the measurement object with the device according to claim 1, the method comprising:
   (i) generating the at least one illumination light beam with the at least one illumination device of the device and illuminating the measurement object, wherein the device comprises the at least one lens having the longitudinal chromatic aberration;
   (ii) capturing at least one measurement light beam generated by the measurement object in response to the at least one illumination light beam with the at least one color sensor of the device and determining the at least one spectrally dependent image space content, wherein the at least one color sensor is arranged in the image plane of the at least one lens; and
   (iii) determining the at least one item of depth information from the spectrally dependent image space content using the at least one evaluation unit of the device.

9. A computer program which, when executed on a computer or a computer network, carries out the method according to claim 8, in particular method steps (ii) to (iii), in one of its configurations.

10. A computer program product comprising a program code stored on a non-transitory machine-readable storage medium for carrying out the method according to claim 8 when the program code is executed on a computer or a computer network.

* * * * *